Oct. 12, 1965 M. G. KAUFMAN 3,211,840

ELECTRO-SONIC DELAY LINE

Filed May 27, 1963

INVENTOR
MAXIME G. KAUFMAN

BY [signature] AGENT

[signature] ATTORNEY

United States Patent Office 3,211,840
Patented Oct. 12, 1965

3,211,840

ELECTRO-SONIC DELAY LINE

Maxime G. Kaufman, Camp Springs, Md., assignor to the United States of America as represented by the Secretary of the Navy Filed May 27, 1963, Ser. No. 283,639
6 Claims. (Cl. 179—100.1)
(Granted under Title 35, U.S. Code (1952), sec. 266)

Figures 1, 2:
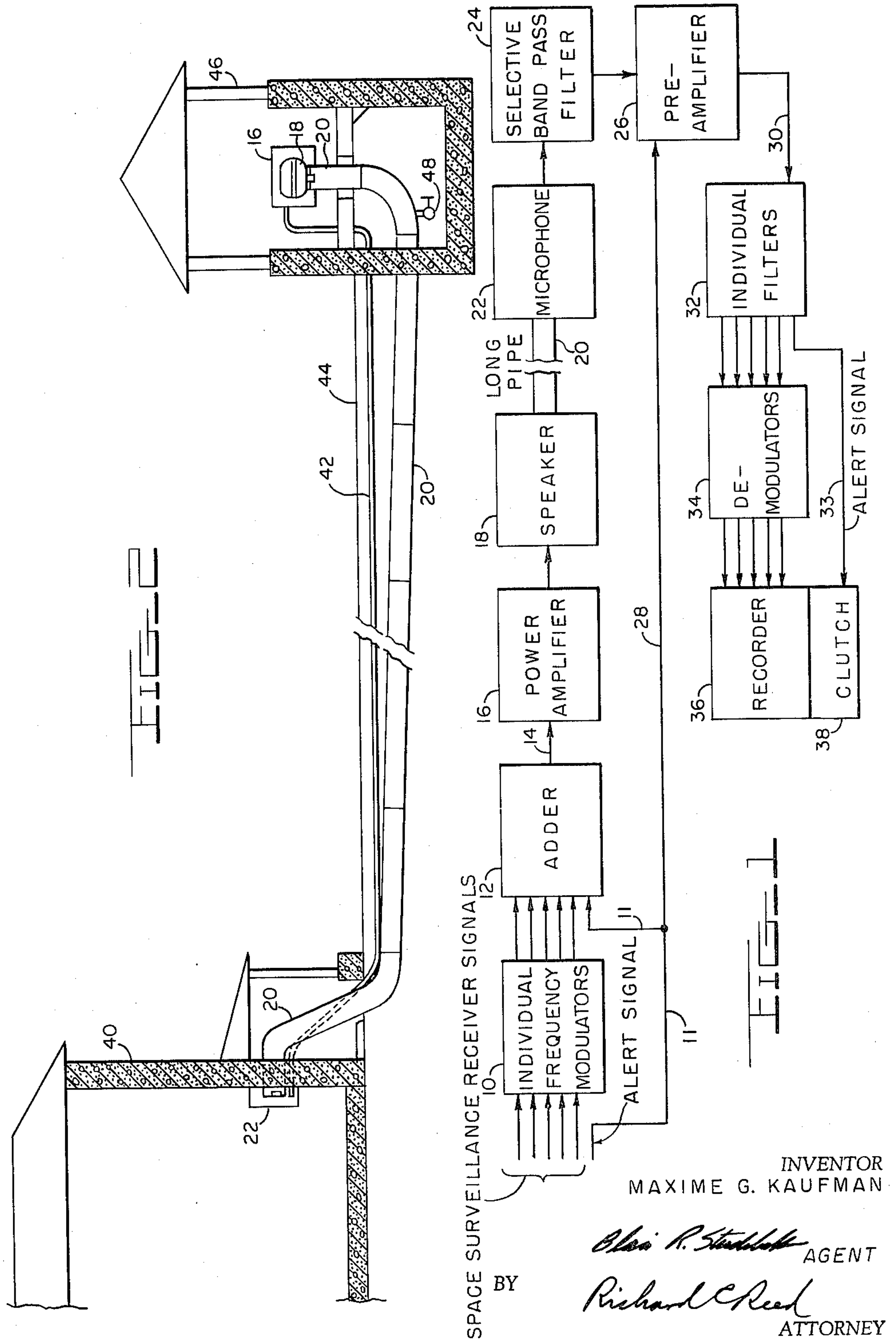

The invention described herein may be manufactured and used by or for the Government of the United States of America for governmental purposes without the payment of any royalties thereon or therefor.

This invention relates generally to electronic communication and recording systems and more particularly to a sonic delay line for such systems.

When it is desired to record periodic non-anticipated signals without loss of any part of such signals as in the continual surveillance of space for detection of satellites or other space vehicles, recorders must be run continually with the consequent waste of relatively large amounts of expensive thermal recording paper. If the recorders are stopped and started automatically only in response to receipt of a signal, valuable information is lost during the time the recorders take to reach normal operating speed.

If a long enough delay, one on the order of ½ second, can be created in the signal transmission from the receivers to the recorders and the recorders actuated by a direct alert pulse the recorders will be at normal operating speed when the delayed information signal is received. Conventional delay systems employing ladder networks, coaxial delay lines, quartz lines, liquid lines and magnetostriction are adequate for short delays of a few milliseconds, but when employed for delays approximating ½ of a second they tend to be huge, lossy and impractical configurations. Longer delays can be obtained from a tape loop or a recording drum but these methods are relatively uneconomical, complicated, unreliable, and subject to continuous maintenance.

The sonic delay line and associated equipment of the present invention provides an inexpensive and reliable system for producing a high quality delay of relatively long duration. Also, maintenance problems, as well as variations in operating parameters due to physical environment, have been substantially eliminated without any loss of signal characteristics.

It is an object of the present invention to provide a signal delay in an electronic communication and recording system.

Another object is the provision of a signal delay on the order of 0.5 second in a signal receiving and recording system.

Still another object of the present invention is to provide a signal recording system whereby the recorders will be started and reach a normal operating speed prior to receipt of the signal to be recorded by the recorders.

Yet another object of the present invention is the provision of a sonic delay of recordable length in the transmission of electrical signals from a receiver to a recorder.

In accordance with the present invention, the sonic delay is produced by employing speaker means for converting signals of telephone line frequency into sound, which is transmitted through a pipe or conduit long enough to provide the desired delay. The sound waves are then reconverted by a microphone to electrical signals of telephone line frequency and transmitted electrically to the recorders.

Other objects and many of the attendant advantages of the present invention will become readily apparent when the following detailed description is considered in conjunction with the accompanying drawing wherein:

FIG. 1 is a schematic block diagram of the transmission and recording systems of the present invention, and FIG. 2 is a diagrammatic view of the sonic delay line employed in the transmission and recording system of FIG. 1.

Referring now in detail to the illustrated embodiment of the present invention, wherein like reference characters represent like parts, there is shown in FIG. 1 a plurality of individual frequency modulators generally designated 10. The number of frequency modulators 10 is controlled solely by the number of channels of information to be received and eventually recorded. As shown in FIG. 1 of the illustrated embodiment a plurality of space surveillance receiver signals is received by the individual frequency modulators 10. Each of these signals are standard IRIG FM-telemetry signals ranging from 250 c.p.s. to 3 kc. After the signals are frequency modulated by individual frequency modulators 10 they are transmitted simultaneously with an alert signal arriving in line 11 to a conventional adder 12, which in turn transmits a composite FM signal through line 14 to power amplifier 16. The amplified signal proceeds in turn to a heavy duty, hermetically sealed, driver-speaker unit 18 which transduces the electrical signal to sound waves. In the experimental embodiment a driver-speaker unit containing a built in multi-impedance line transformer with power taps and designed for operation between 70 and 12,000 c.p.s. was employed. The sound waves are transmitted through a long pipe or conduit 20 and are picked up at the other end thereof by a conventional microphone 22 of the "Electro Voice" type. An acoustic filter may be mounted within the pipe at the pick-up end in order to pass the high frequencies with minimum attenuation but reduce the amplitude of the low frequency end if desired.

Microphone 22 transduces the sound waves back to a composite electrical FM telemetry signal which is filtered by the selective band filter 24 to eliminate any extraneous signals picked up during the pipe travel of the sound waves.

The alert signal which accompanies the space surveillance receiver signals through the sonic delay line is also fed directly to pre-amplifier 26 through line 28 for direct transmission to a relay actuated clutch mechanism 38 which starts the recorders and actuates the recorder's parallel-time-readout equipment. The pre-amplifier 26 is used to amplify the signal in the illustrated embodiment for transmission over telephone lines 30 to a remote recording site. Pre-amplifier 26 could be, of course, eliminated if the recording is done at the receiving site. When the composite signal is received at the recording site, it is filtered through individual filters 32 into separate data signals and each signal is then individually frequency demodulated by demodulators 34 and recorded on a multi-channel paper pen recorder 36. In practice, eight data signals and eight separate recording channels have been employed, but any number of channels may be used without departing from the scope of the present invention.

Referring now to FIG. 2 for details of the sonic delay line employed in the present invention, there is shown a space surveillance receiving station 40 located to receive reflected signals from earth orbiting bodies. The signals received are frequency modulated and added in station 40 and transmitted through transmission line 14 which is encased in a polyethylene or similar hose 42 embedded in the ground 44. The composite signal carried by line 14 is amplified and transduced into sound in auxiliary station 46 and transmitted through the long pipe 20, which is also a few feet underground, back to the main station 40 where microphone 22 is located, for conversion back to an electrical signal and transmission to recorder 36. The speaker unit 18 is mounted on the end of pipe 20 in a manner to form a seal therewith to prevent loss of sound intensity. On the other end of pipe 20 microphone unit 22 seals off the remaining open end of the pipe, thus providing a closed column of air. As can be seen in FIG. 2, pipe 20 is laid in the ground with a slight slope toward drain cock 48 to facilitate flow of any condensation to that point for removal from the pipe.

Although any material will suffice for pipe 20, it has been found that fiber pipe is to be preferred both from the standpoint of expense and in that it is almost completely insensitive to external physical noise. The burying of the pipe further insulates it from external noise to the extent that even a tractor traveling directly overhead has no significant effect on the operation of the system. Another reason for burying the pipe is to eliminate wide variations in temperature from affecting the delay.

The sonic delay produced by the pipe is about one millisecond per foot of pipe length and it has been found that with a test length of 600 feet of pipe one millisecond of delay is lost with each degree rise in temperature above 72° F. Since a relatively "bulky" delay on the order of ½ second is desired, the combination of 600 feet of length and burying the pipe insures a delay of slightly over the minimum ½ second desired. The requirement for a ½ second delay not only assures that the recorder will be at an operating speed, which in most cases requires considerably less than ½ second, when the delayed space surveillance signals are received, but also provides sufficient time for an ascertainable length of delay to be inscribed by the parallel-time-readout equipment on the recorder. The parallel-time-readout equipment is actuated by the undelayed alert signal and stopped by the delayed alert signal to indicate the exact length of the sonic delay produced. By providing an indication on the recorder of the exact time length of the delay, the "real" time at which the orbiting object was detected can be readily and quickly ascertained.

Although the pipe 20 of the illustrated embodiment is shown to be totally linear, a U-shaped configuration, or for that matter, even a pipe having several bends to provide comparatively short parallel sections, can be employed without any noticeable effect on the signals transmitted.

In operation the space surveillance receivers pick up signals reflected from an earth orbiting body and actuate an alert signal of conventional telephone frequency which is transmitted without any significant delay directly through line 28 to pre-amplifier 26 for transmission over line 30 to the recording site, thus almost simultaneously actuating recorder 36, through associated clutch mechanism 38, and the associated parallel, time-readout equipment. Simultaneously with this transmission the receiver signals will be frequency modulated by individual frequency modulators 10 and formulated along with the alert signal traveling in line 11 into a composite electrical signal by adder 12. This composite signal then travels through line 14 in hose 42 to the amplifier and speaker units 16 and 18 where it is first amplified and then transduced into sound waves which traverse pipe 20 for introduction of the desired delay, approximately one millisecond delay per foot of pipe length. At the other end of pipe 20 microphone unit 22 picks up the sound wave and transduces it back to a composite electrical signal of telephone line frequency bandwidth, which is then filtered for removal of extraneous noises of non-selected frequencies by selective bandpass filter 24, amplified by pre-amplifier 26 and transmitted to the recording site over line 30. At the recording site the separate standard IRIG FM telemetry data signals are filtered by individual filters 32, frequency demodulated by demodulator 34 and recorded on their respective channels of the recorder 36. The alert signal which has accompanied the surveillance receiver signals through the delay line will also be filtered by an individual filter 32 and transmitter over line 33 directly to the relay clutch mechanism 38 to stop the parallel-time-readout equipment so that the exact extent of the delay will be indicated to provide a basis for ascribing "real" times to the recorded signals.

It will be apparent from the foregoing that the sonic delay line of the present invention provides a system which is simple, inexpensive, and reliable, and yet supplies the required delay with little or no significant signal degradation in a communication and recording system wherein a noncontinuous operation of recorders is desired without loss of any part of intermittently received data carrying signals.

Obviously many modifications and variations of the present invention are possible in light of the foregoing teachings and it is to be understood that the scope of this invention is to be limited only by the appended claims and not otherwise.

What is claimed is:

1. A system for actuating a recorder while the signal to be recorded is delayed, comprising:

(a) a recorder, (b) first circuit means for activating said recorder in response to a first electrical signal, (c) second circuit means for combining said first electrical signal and a simultaneous second electrical signal into a composite electrical signal, (d) means in said second circuit including an elongated pipe for converting said composite electrical signal into a sound wave, transmitting said sound wave through said pipe and reconverting said sound wave back to said composite signal whereby a sonic delay is imparted to said composite signal, and (e) means in said second circuit for dividing said composite signal into said first and second signals and transmitting said first and second signals to said recorder after said delay.

2. A system for delaying a signal to be recorded while the recorder is reaching an operating speed, comprising:

(a) first circuit means for activating the recorder in response to a first electrical signal, (b) second circuit means for combining said first electrical signal and a second electrical signal into a composite electrical signal, (c) an elongated pipe containing a column of air, (d) first transducer means in said second circuit for converting said composite electrical signal into a sound wave and transmitting said sound wave through said pipe, and (e) second transducer means for reconverting said sound wave back to said composite electrical signal after said sound wave tranverses said pipe, said second circuit means thereafter transmitting said composite signal to said recorder.

3. A system for imparting a sonic delay to a plurality of electrical signals to be recorded while the recorder is being brought to an operating speed, comprising:

(a) a first circuit for directly conducting one of said plurality of electrical signals to actuate said recorder, (b) a second circuit including electronic means for individually frequency modulating each of the remaining signals of said plurality and combining said remaining signals and said one of said signals into a single composite frequency modulated signal, (c) an elongated rigid pipe containing a column of air, (d) first transducer means connected between one end of said pipe and said electronic means for transducing said composite signal into a sound wave, (e) second transducer means connected to the other end of said pipe for receiving said sound wave and transforming it back into a composite electric signal, and (f) means connected to the output of said second transducer means for converting said composite electrical signal into a plurality of individual electrical signals and demodulating said frequency modulated signals prior to the delayed recording thereof by said recorder.

4. A system for imparting a sonic delay to a plurality of electrical signals to be recorded while the recorder is being brought to an operating speed, comprising:

(a) a first circuit for directly conducting an alert signal to actuate said recorder, (b) a second circuit including a plurality of frequency modulators for individually frequency modulating each of said plurality of signals, (c) electronic means connected to the outputs of said frequency modulators for combining said plurality of signals and said alert signal into a single composite frequency modulated signal, (d) conduit means containing a column of air, (e) a first transducer connected between one end of said conduit means and said electronic means for transducing said composite signal into a sound wave, (f) a second transducer connected to the other end of said conduit means for receiving said sound wave and transforming it back into a composite electrical signal, and (g) a third circuit connected to the output of said second transducer for converting said composite electrical signal into a plurality of individual electrical signals and said alert signal and demodulating said individual signals prior to the delayed recording thereof by said recorder.

5. A system for imparting a sonic delay to a plurality of electrical signals to be recorded while the recorder is being brought to an operating speed, comprising:

(a) a first circuit for directly conducting one of said plurality of electrical signals to actuate said recorder, (b) a second circuit including a plurality of frequency modulators for individually frequency modulating each of the remainder of said plurality of signals, (c) electronic means connected to the outputs of said frequency modulators for combining said remainder of said plurality of signals and said one of said signals into a single composite frequency modulated signal, (d) an elongated rigid pipe containing a column of air, (e) a speaker connected between one end of said pipe and said electronic means for transducing the composite signal provided by said electronic means into a sound wave, (f) a microphone connected to the other end of said pipe for receiving and transforming said sound wave back into said composite electrical signal, and (g) filter and demodulating means connected to the output of said microphone for converting said composite electrical signal into a plurality of individual electrical signals and demodulating all but said one of said individual signals prior to the delayed recording thereof by said recorder, said recorder indicating the length of the delay imparted by said pipe by the difference in time of reception by said recorder of said one of said signals carried by said first circuit and said one of said signals accompanying said plurality of signals.

6. A system according to claim 5 wherein said pipe is non-metallic and imparts a delay of one millisecond per foot of pipe to said composite signal.

References Cited by the Examiner

UNITED STATES PATENTS

| | | | |
|---|---|---|---|
| 1,807,658 | 6/31 | Godsey | 333—30 |
| 2,391,897 | 1/46 | Harrington. | |
| 2,406,859 | 9/46 | Smith | 333—30 |
| 2,419,894 | 4/47 | Hayes | 179—1.6 |
| 2,904,682 | 9/59 | Rawlins | 179—100.2 |

IRVING L. SRAGOW, *Primary Examiner.*

BERNARD KONICK, *Examiner.*